(12) United States Patent
Choe et al.

(10) Patent No.: US 11,704,901 B2
(45) Date of Patent: Jul. 18, 2023

(54) METHOD OF DETECTING WRINKLES BASED ON ARTIFICIAL NEURAL NETWORK AND APPARATUS THEREFOR

(71) Applicant: LULULAB INC., Seoul (KR)

(72) Inventors: Yongjoon Choe, Seoul (KR); Se Min Kim, Ansan-si (KR); Sang Wook Yoo, Seoul (KR); Chan Hyeok Lee, Seoul (KR); Jong Ha Lee, Hwaseong-si (KR)

(73) Assignee: LULULAB INC., Seoul (KR)

( * ) Notice: Subject to any disclaimer, the term of this patent is extended or adjusted under 35 U.S.C. 154(b) by 0 days.

(21) Appl. No.: 17/967,445

(22) Filed: Oct. 17, 2022

(65) Prior Publication Data

US 2023/0075333 A1 Mar. 9, 2023

(30) Foreign Application Priority Data

Sep. 3, 2021 (KR) .................. 10-2021-0117687
Mar. 25, 2022 (KR) .................. 10-2022-0037541
Apr. 25, 2022 (KR) .................. 10-2022-0050797

(51) Int. Cl.
*G06V 10/82* (2022.01)
*G06T 7/11* (2017.01)
(Continued)

(52) U.S. Cl.
CPC ................ *G06V 10/82* (2022.01); *G06T 7/11* (2017.01); *G06T 7/73* (2017.01); *G06V 10/454* (2022.01);
(Continued)

(58) Field of Classification Search
CPC ...... G06V 10/82; G06V 10/454; G06V 10/84; G06V 2201/08; G06T 7/11; G06T 7/73;
(Continued)

(56) References Cited

U.S. PATENT DOCUMENTS

2022/0254019 A1* 8/2022 Connor ................ G06T 7/0012

FOREIGN PATENT DOCUMENTS

| KR | 10-1076307 B1 | 10/2011 |
| KR | 10-1828503 B1 | 3/2018 |
| KR | 10-2297301 B1 | 9/2021 |

OTHER PUBLICATIONS

Vanderfeesten, Ron, and Jacco Bikker. "Example-Based Skin Wrinkle Displacement Maps." 2018 31st SIBGRAPI Conference on Graphics, Patterns and Images (SIBGRAPI). IEEE, 2018. (Year: 2018).*

(Continued)

*Primary Examiner* — Bobbak Safaipour
(74) *Attorney, Agent, or Firm* — Sughrue Mion, PLLC

(57) ABSTRACT

According to various embodiments, a wrinkle detection service providing server for providing a wrinkle detection method based on an artificial intelligence may include a data pre-processor for obtaining a skin image of a user from a skin measurement device and performing pre-processing based on feature points based on the skin image; a wrinkle detector for inputting the skin image pre-processed through the data pre-processing into an artificial neural network and generating a wrinkle probability map corresponding to the skin image; a data post-processor for post-processing the generated wrinkle probability map; and a wrinkle visualization service providing unit for superimposing the post-processed wrinkle probability map on the skin image and providing a wrinkle visualization image to a user terminal of the user.

4 Claims, 5 Drawing Sheets

(51) Int. Cl.
    *G06T 7/73* (2017.01)
    *G06V 10/44* (2022.01)
    *G06V 10/84* (2022.01)

(52) U.S. Cl.
    CPC .... *G06V 10/84* (2022.01); *G06T 2207/20076* (2013.01); *G06T 2207/20081* (2013.01); *G06T 2207/20084* (2013.01); *G06T 2207/30088* (2013.01); *G06V 2201/08* (2022.01)

(58) Field of Classification Search
    CPC . G06T 2207/20076; G06T 2207/20081; G06T 2207/20084; G06T 2207/30088
    See application file for complete search history.

(56) References Cited

OTHER PUBLICATIONS

Korean Notice of Result of Preliminary Examination of No. 10-2022-0050797 dated Jun. 8, 2022.
Korean Notice of Allowance of No. 10-2022-0050797 dated Jul. 18, 2022.

* cited by examiner

METHOD OF DETECTING WRINKLES BASED ON ARTIFICIAL NEURAL NETWORK AND APPARATUS THEREFOR

CROSS-REFERENCE TO RELATED APPLICATION

This application claims priority to Korean Patent Application No. 10-2021-0117687, filed on Sep. 3, 2021; Korean Patent Application No. 10-2022-0037541, filed on Mar. 25, 2022; and Korean Patent Application No. 10-2022-0050797, filed on Apr. 25, 2022, in the Korean Intellectual Property Office, the disclosure of which is incorporated herein by reference.

BACKGROUND OF THE DISCLOSURE

Field of the Disclosure

The present disclosure relates a method of detecting wrinkles based on an artificial neural network and an apparatus therefor, and more particularly, to a method of detecting wrinkles based on an ensemble model using a plurality of artificial neural networks and an apparatus therefor.

Description of the Related Art

Recently, as people's lives are enriched and their quality of life has improved, interest in skin care is increasing. In particular, in line with popularization of the terms "a baby face" and "a skin beauty" online, white, wrinkle-free, and clean skin is regarded as a major criterion for determining a beauty. As interest in skin care increases significantly, men as well as women are investing a lot of time and money in skin care.

Therefore, companies that manufacture cosmetics, foods, and pharmaceuticals for skin care or improvement of a skin condition are investing a lot of time and effort to develop more effective products. In addition to these efforts, it is important to determine a skin condition before using a skin improvement product and to determine the efficacy of the skin improvement product after using the skin improvement product. There is increasing demand for a technique for diagnosing a user's skin condition based on a skin image or skin wrinkle image taken before using a skin improvement product and evaluating the efficacy of the skin improvement product based on a skin image or skin wrinkle image taken after using the skin improvement product.

Recently, research on artificial intelligence that imitates human intelligence to diagnose skin conditions is being actively conducted. Artificial intelligence is a broad concept that includes machine learning that learns and operates using machine learning algorithms. In the field of machine learning, deep learning implemented by imitating human neurons is known as a more advanced concept. A deep neural network (DNN) based on deep learning is an artificial neural network (ANN) that includes multiple hidden layers, learns various nonlinear relationships, and provides prediction results based on the learning results. Interest in the deep neural network is increasing, and research on the deep neural network is being actively conducted.

In particular, to detect wrinkles based on a skin image, a convolutional neural network (CNN) for processing two-dimensional data such as an image is mainly used. For the convolutional neural network, various models such as U-Net, shallow-CNN, AlexNet, and ResNet are being discussed.

RELATED ART DOCUMENTS

Patent Documents (Patent Document 1) Korean Patent No. 10-2297301 (Published on Jan. 9, 2020)
(Patent Document 2) Korean Patent No. 10-1076307 (Published on Aug. 25, 2010)
(Patent Document 3) Korean Patent No. 10-1828503 (Published on Aug. 23, 2017)

SUMMARY OF THE DISCLOSURE

Therefore, the present disclosure has been made in view of the above problems, and it is an object of the present disclosure to provide a method of detecting wrinkles using a semantic segmentation model, a patch segmentation model, and an ensemble model combining the semantic segmentation model and the patch segmentation model.

In accordance with one aspect of the present disclosure, provided is a wrinkle detection service providing server for providing a wrinkle detection method based on an artificial intelligence including a data pre-processor for obtaining a skin image of a user from a skin measurement device and performing pre-processing based on feature points based on the skin image; a wrinkle detector for inputting the skin image pre-processed through the data pre-processing into an artificial neural network and generating a wrinkle probability map corresponding to the skin image; a data post-processor for post-processing the generated wrinkle probability map; and a wrinkle visualization service providing unit for superimposing the post-processed wrinkle probability map on the skin image and providing a wrinkle visualization image to a user terminal of the user.

According to various embodiments, the wrinkle detector may be trained using training data consisting of a training input value corresponding to a skin image of each of a plurality of users obtained from a plurality of user terminals and a training output value corresponding to the wrinkle probability map, may include a wrinkle detection model that generates the wrinkle probability map corresponding to the user based on a deep learning network consisting of a plurality of hidden layers, may input the pre-processed skin image of the user into the wrinkle detection model based on a convolutional neural network (CNN), and may generate a wrinkle probability map corresponding to the skin image based on output of the wrinkle detection model.

According to various embodiments, the wrinkle detection model may include a feature map extraction layer including at least one convolutional layer that receives a learning feature vector obtained by transforming learning data according to a skin image of a preset size, at least one activation layer, and at least one pooling layer; a fully-connected layer that transmits an output vector calculated using output values received from the feature map extraction layer to an output layer; and an output layer that determines a probability corresponding to the output vector by applying an activation function to the output vector, and outputs an output vector having the highest determined probability.

According to various embodiments, based on a training input value corresponding to a skin image of each of a plurality of users, the wrinkle detector may train a first segmentation model for extracting a local feature and a second segmentation model for extracting a global feature.

According to various embodiments, the wrinkle detector may determine a first output value output when a training input value corresponding to a skin image of each of a plurality of users is input to the first segmentation model and a second output value output when the training input value is input to the second segmentation model, and may train the wrinkle detection model, which is an ensemble model that outputs a wrinkle probability map by inputting training data obtained by applying a first weight to the first output value and applying a second weight to the second output value into a fully-connected layer.

According to various embodiments, the data pre-processor may determine whether an obtained skin image is suitable for wrinkle detection based on the brightness value, contrast value, and resolution of the image, may determine a wrinkle cluster in the skin image, and may set an ROI mask corresponding to the determined wrinkle cluster. The data post-processor may binarize the generated wrinkle probability map. The wrinkle visualization service providing unit may match the wrinkle probability map binarized based on the ROI mask to the skin image and generate the wrinkle visualization image, and may transmit the generated wrinkle visualization image to the user terminal.

According to various embodiments, the first segmentation model may be a patch segmentation-based model having a structure capable of high-speed processing, unlike a conventional method, and the second segmentation model may be a U-Net-based model. The wrinkle detector may generate ensemble data by combining, in a depth direction, first output data passing through a convolutional layer that is a layer immediately preceding an output layer of the first segmentation model and second output data passing through a deconvolutional layer that is a layer immediately preceding an output layer of the second segmentation model, and may input the generated ensemble data to a final convolutional layer to train the ensemble model.

According to various embodiments, the ensemble model may calculate a loss function according to the following equation using an output vector obtained as an output of hidden layers when the training input value is input and a training output vector corresponding to a wrinkle probability map according to the training output value, and may be subjected to supervised learning such that the calculated result value of the loss function is minimized.

$$L_{dice} = 1 - \frac{2 \times \sum_i^n (p_i \times g_i)}{\sum_i^n (p_i^2) + \sum_i^n (g_i^2)}$$

In the equation, $L_{dice}$ means the loss function, n represents the number of samples that are skin images of each of a plurality of users, $p_i$ represents an i-th predicted value, and $g_i$ represents an actual ground truth (GT) value.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
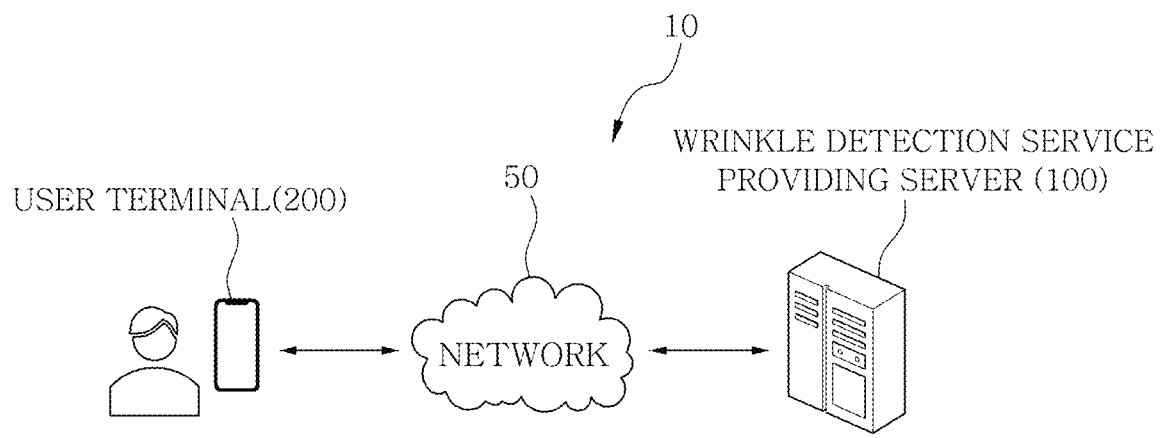
FIG. 1 is a diagram illustrating a system for providing a wrinkle detection service according to one embodiment.

Since the present disclosure may be applied with various modifications and may have various embodiments, exemplary embodiments and drawings of the present disclosure are intended to be explained and exemplified. However, these exemplary embodiments and drawings are not intended to limit the embodiments of the present disclosure to particular modes of practice, and all changes, equivalents, and substitutes that do not depart from the spirit and technical scope of the present disclosure should be understood as being encompassed in the present disclosure. Like reference numerals refer to like elements in describing each drawing.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present disclosure. As used herein, the term "and/or" includes any or all combinations of one or more of the associated listed items.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present.

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments according to the present disclosure will be described in detail with reference to the accompanying drawings.

FIG. 1 is a diagram illustrating a system 10 for providing a wrinkle detection service according to one embodiment. Referring to FIG. 1, the system 10 for providing a wrinkle detection service may include a wrinkle detection service providing server 100, a user terminal 200, and the like.

In addition to the server 100, the operations described below may be implemented by the user terminal 200. That is, the following operations performed by a data pre-processor 101, a wrinkle detector 102, a data post-processor 103, and a wrinkle visualization service providing unit 104 may be understood as modules operated by a processor included in the user terminal 200. That is, the server 100 is described as one operating subject as an example of hardware performing a software operation, and it will be apparent at the level of a person skilled in the art that such an operating subject may be the user terminal 200.

In another embodiment, the operations described below may be performed or implemented through a platform (e.g., a web page and/or an application) controlled by the wrinkle detection service providing server 100. That is, the wrinkle detection service providing server 100 may provide a website where a user may access the wrinkle detection service providing server 100 through a network using the user terminal 200 to input, register, and output various information, and may provide an application capable of inputting, registering, and outputting various information by being installed and executed in the user terminal 200.

The wrinkle detection service providing server 100 may generate a wrinkle visualization image so that user's wrinkles may be visually confirmed based on a user's skin image captured by a skin measurement device or a user's skin image captured by a camera mounted on the user terminal 200, and may transmit the generated wrinkle visualization image to the user terminal 200.

The user terminal 200 may include at least one camera and a processor, and may capture a user's skin image through the camera. The user terminal 200 may transmit the captured user's skin image to the wrinkle detection service providing server 100. The user terminal 200 may be a device or apparatus having a communication function, such as a desktop computer, a laptop computer, a notebook, a smartphone, a tablet PC, a mobile phone, a smart watch, a smart glass, an e-book reader, a portable multimedia player (PMP), a handheld game console, a navigation device, a digital camera, a digital multimedia broadcasting (DMB) player, a digital audio recorder, a digital audio player, a digital video recorder, a digital video player, or a personal digital assistant (PDA).

The wrinkle detection service providing server 100 and the user terminal 200 may be connected to a communication network 50, respectively, and may transmit/receive data to and from each other through the communication network 50. For example, as the communication network 50, various wired or wireless networks such as a local area network (LAN), a metropolitan area network (MAN), Global System for Mobile Network (GSM), Enhanced Data GSM Environment (EDGE), High-Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), LTE Advanced, IEEE802.16m, WirelessMAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), World Interoperability for Microwave Access (Wi-MAX), and 5G may be used.

Figure 2:
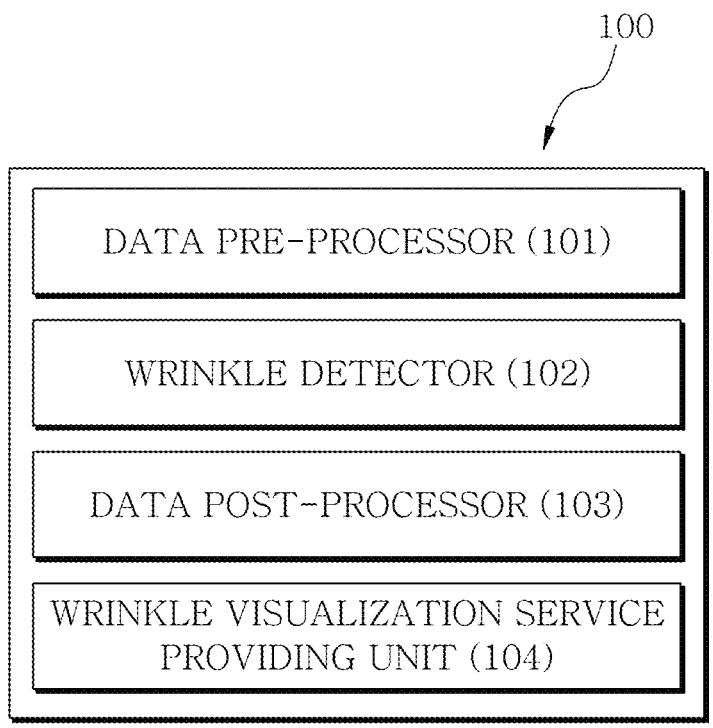
FIG. 2 is a diagram showing the major components of a wrinkle detection service providing server.

FIG. 2 is a diagram showing the major components of the wrinkle detection service providing server 100. The wrinkle detection service providing server 100 may include the data pre-processor 101, the wrinkle detector 102, the data post-processor 103, and a wrinkle detection service providing unit 104.

The data pre-processor 101 may obtain a user's skin image captured by the user terminal 200 from the user terminal 200. The data pre-processor 101 may perform pre-processing based on feature points based on a user's skin image. The pre-processing may include processes performed before a skin image is input into an artificial neural network model (e.g., a wrinkle detection model).

The wrinkle detector 102 may input a user's skin image pre-processed through the data pre-processor 101 into an artificial neural network model (e.g., a wrinkle detection model). In addition, the wrinkle detector 102 may train the artificial neural network model (e.g., a wrinkle detection model) by using a plurality of skin images obtained from a plurality of user terminals as learning data. The wrinkle detector 102 may extract a wrinkle probability map corresponding to the skin image as an output of the artificial neural network model. The wrinkle detector 102 may transmit the extracted wrinkle probability map to the data post-processor 103.

The data post-processor 103 may binarize the extracted wrinkle probability map. The data post-processor 103 may adjust the size and/or angle of the wrinkle probability map so that the binarized wrinkle probability map may be mapped to the user's skin image.

The wrinkle visualization service providing unit 104 may perform wrinkle visualization by superimposing the adjusted wrinkle probability map on the user's skin image. The wrinkle visualization service providing unit 104 may transmit the wrinkle visualization image to the user terminal 200.

Figure 3:
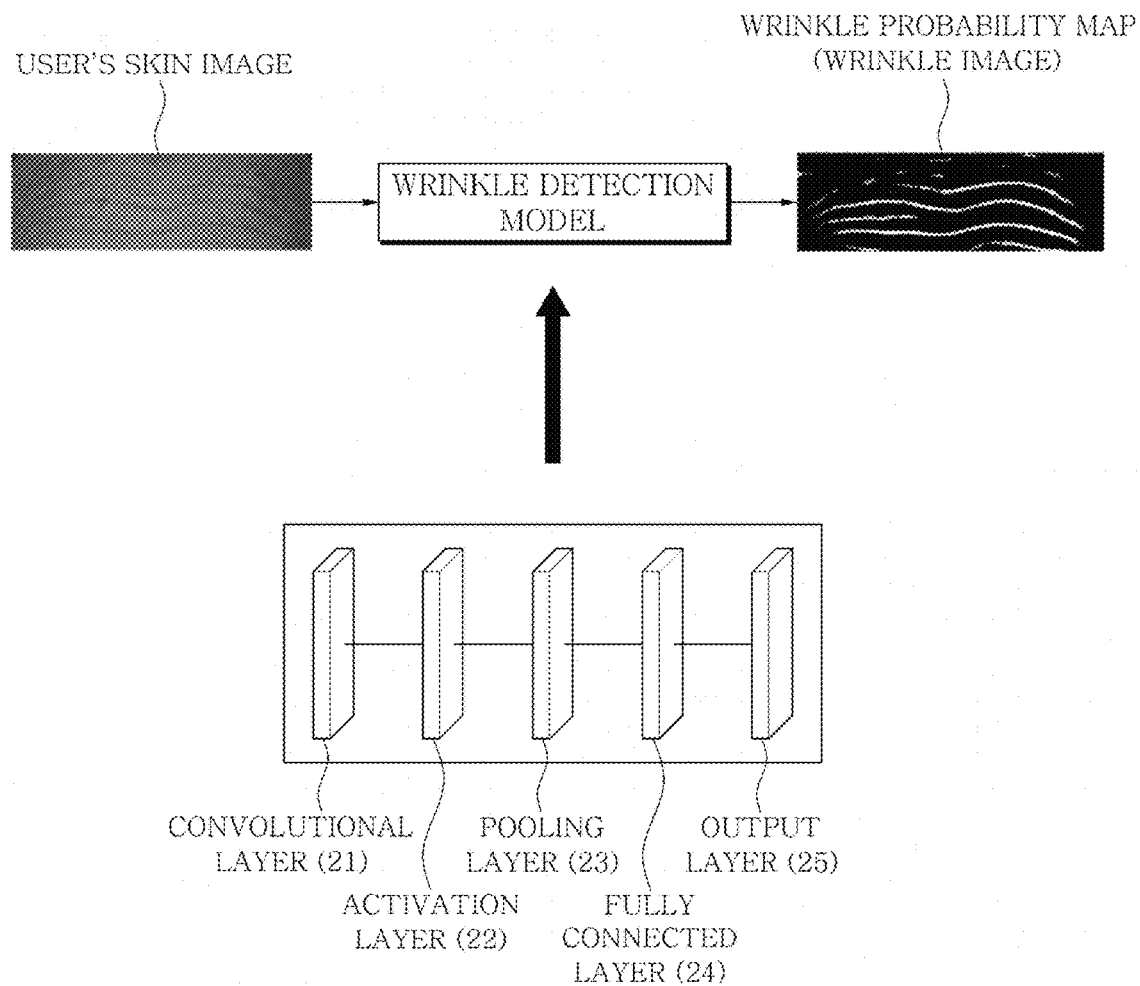
FIG. 3 is a diagram illustrating a process in which a skin image is input and a wrinkle probability map is extracted according to one embodiment.

FIG. 3 is a diagram illustrating a process in which a skin image is input and a wrinkle probability map is extracted according to one embodiment.

The data pre-processor 101 may obtain a user's skin image from a skin measurement device and/or the user terminal 200. The data pre-processor 101 may obtain skin images for training artificial neural network models.

The data pre-processor 101 may determine whether an obtained skin image is suitable for training artificial neural network models or for wrinkle detection. Based on a brightness value and contrast value of an obtained skin image, the data pre-processor 101 may determine whether the obtained skin image is suitable. In addition, when the number of hairs that may interfere with wrinkle detection in an obtained skin image exceeds a preset number, or the resolution of the skin image is lower than a preset resolution (e.g., 320×320), the data pre-processor 101 may determine than the image is not suitable.

Since the skin color is different for each person, the data pre-processor 101 may adjust the brightness value, contrast value, and the like of the skin image, and may convert the skin image into a gray scale image.

The data pre-processor 101 may set feature points in a user's skin image. That is, the data pre-processor 101 may set feature points through an open source library for images including faces.

The data pre-processor 101 may set a region of interest (ROI) based on the generated feature points. That is, the data pre-processor 101 may apply an ROI mask to a region expected to be a user's wrinkle cluster.

The data pre-processor 101 may perform correction according to a preset guide (procedure). The correction according to the preset guide may include correction for hue, brightness, contrast, and partial brightness.

In addition, the data pre-processor 101 may perform random HSV (hue, saturation, value) adjustment in a specific range based on a Gaussian blur filter having a kernel size of 3.

The data pre-processor 101 may apply an ROI mask to a region expected to be a wrinkle cluster, and may apply contrast-limited adaptive histogram equalization. Then, the wrinkle detector 102 may extract a feature map from a pre-processed skin image using a difference of Gaussian. Wrinkles may be segmented through an adaptive threshold method in the feature map. Segmented wrinkles may be classified into wrinkles longer than a preset length, wrinkles shorter than a preset length, wrinkles deeper than a preset depth, and bifurcated wrinkles.

According to one embodiment, the artificial neural network-based wrinkle detection model may be configured as a convolutional neural network 20. The convolutional neural network may include a convolutional layer 21 that receives image frames of a preset size as input images and extracts a feature map, an activation layer 22 that determines whether to activate an output using an activation function for the extracted features, a pooling layer 23 that performs sampling on the output according to the activation layer 22, a fully-connected layer 24 that performs classification according to class, and an output layer 25 that finally outputs an output according to the fully-connected layer 24.

The convolutional layer 21 may be a layer that extracts the features of input data by convolution of an input image and a filter. Here, the filter may be a function that detects a characteristic portion of an input image, may be generally expressed as a matrix, and may be a function determined as being continuously trained by learning data. The feature extracted by the convolutional layer 21 may be referred to as a feature map. In addition, an interval value for which convolution is performed may be referred to as a stride, and a feature map having a different size may be extracted according to a stride value. In this case, when the filter is smaller than an input image, the feature map has a smaller size than an existing input image. A padding process may be additionally performed to prevent loss of features through several steps. In this case, the padding process may be a process of keeping the size of an input image and the size of a feature map the same by adding a preset value (e.g., 0 or 1) to the outside of the generated feature map.

Here, as the convolutional layer 21 according to one embodiment of the present disclosure, a structure in which a 1×1 convolutional layer and a 3×3 convolutional layer are sequentially and repeatedly connected may be used, but the present disclosure is not limited thereto.

The activation layer 22 is a layer that determines whether to activate by converting a feature extracted with a certain value (or matrix) into a non-linear value according to an activation function. As the activation function, a sigmoid function, an ReLU function, a softmax function, or the like may be used. For example, the softmax function may be a function with a characteristic that all input values are normalized to values between 0 and 1, and the sum of output values is always 1.

The pooling layer 23 may be a layer that selects a feature representing a feature map by performing subsampling or pooling on an output of the activation layer 22. Max pooling for extracting the largest value for a certain region of the feature map, average pooling for extracting an average value, or the like may be performed. In this case, the pooling layer is not necessarily performed after the activation function, but may be selectively performed.

In addition, the convolutional neural network 20 may include a plurality of connection structures for the convolutional layer 21, the activation layer 22, and the pooling layer 23. For example, the convolutional neural network 20 may be a CNN-based shallow convolutional neural network (S-CNN), You Look Only Once (YOLO), Single Shot MultiBox Detector (SSD), Faster R-CNN, ResNet, U-Net, or the like, or may be a deep neural network of an improved form based thereon, but the present disclosure is not limited thereto.

Figure 4:
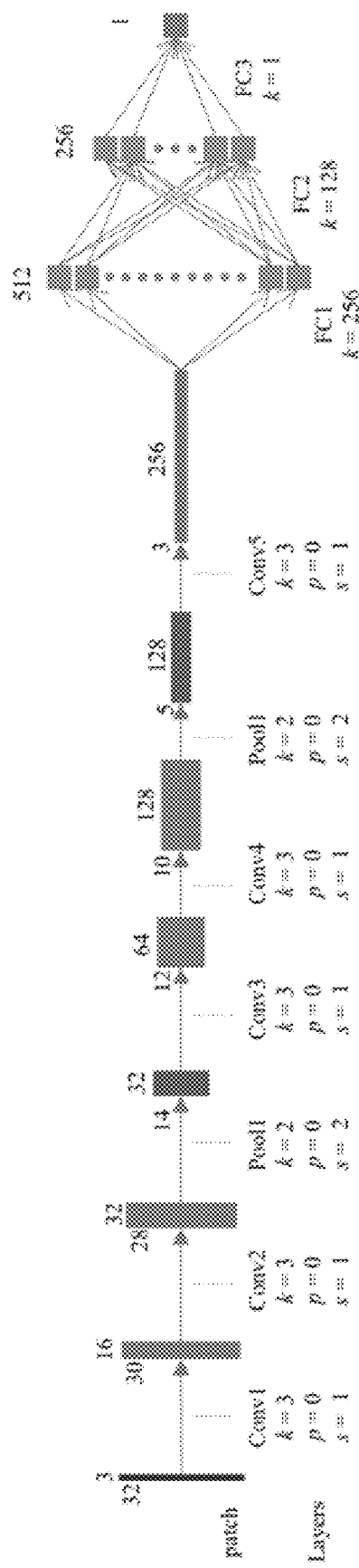
FIG. 4 shows a patch classification model according to one embodiment.

FIG. 4 shows a patch classification model according to one embodiment. The patch classification model to be described below has an effect of removing duplicate work between adjacent patch data.

The patch classification model may include a preset number of convolutional layers and a preset number of fully-connected layers. For example, the patch classification model may include five convolutional layers and three fully-connected layers. The patch classification model may be obtained by using patch data as input data. The patch data may be data generated by cropping a user's skin image.

The patch data may include 3D data, and may include width data, height data, and depth data. The width and height of the patch data may be expressed as $l_p$, and the width and height data of the patch data may be composed of even bits. The center of the patch data may be expressed as $c_x = l_p/2 - 1$ and $c_y = l_p/2 - 1$.

When patch data is input to the patch classification model, the input patch data may pass through a first convolutional layer (k=3, p=o, s=1) and a second convolutional layer (k=3, p=0, s=1), and then may pass through a first pooling layer (k=2, p=0, s=2). The patch data that has passed through the first pooling layer may pass through a third convolutional layer (k=3, p=0, s=1) and a fourth convolutional layer (k=3, p=0, s=1) sequentially, and may pass through a second pooling layer (k=2, p=0, s=2) and a fifth convolutional layer (k=3, p=0, s=1) sequentially. Data output through the fifth convolutional layer may be input into a first fully-connected layer (k=256), and may be output through a second fully-connected layer (k=128) and a third fully-connected layer (k=1) sequentially.

In an embodiment, a first drop-out layer may be configured as a subsequent layer of the first fully-connected layer, and a second drop-out layer may be configured as a subsequent layer of the second fully-connected layer. After the third fully-connected layer, a final inferred value may be output through an activation function (e.g., a sigmoid function).

The patch classification model according to one embodiment may be configured without applying zero padding (p=0). In one embodiment, the activation layer (e.g., an ReLU layer) may be included as a subsequent layer of all layers except for the pooling layer and the third fully-connected layer. Here, "k" represents the size of a kernel. When k=3, the size of a filter (i.e., a kernel) may be 3×3. "p" may mean a process of keeping the size of an input image and the size of a feature map the same by adding a preset value (e.g., 0 or 1) to the outside of a feature map generated by padding. "s" may mean a stride that is an interval value through which convolution is performed.

Figure 5:
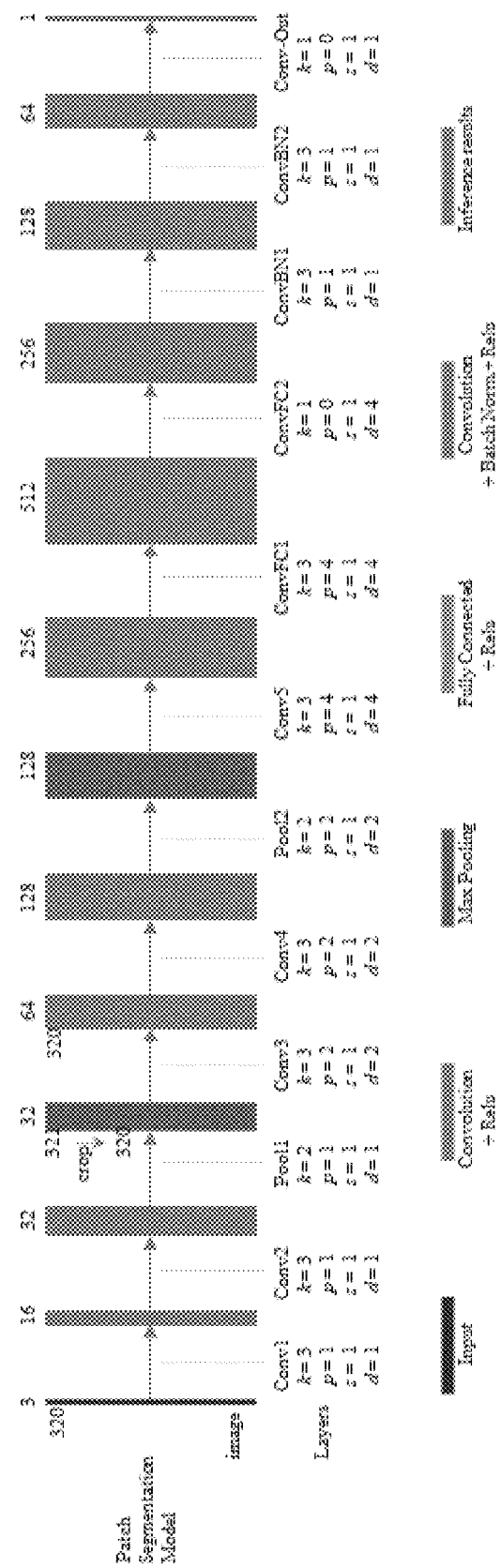
FIG. 5 shows a first segmentation model (e.g., a patch segmentation model) according to one embodiment.

FIG. 5 shows a first segmentation model (e.g., a patch segmentation model) according to one embodiment.

The first segmentation model may include a preset number of convolutional layers and a preset number of fully-connected layers. For example, the first segmentation model may include five convolutional layers and three fully-connected layers. The patch classification model may be obtained by using patch data as input data. The patch data may be data generated by cropping a user's skin image.

When a skin image is input into the first segmentation model, the input skin image may pass through a first convolutional layer (k=3, p=1, s=1, d=1) and a second convolutional layer (k=3, p=1, s=1, d=1), and then may pass through a first pooling layer (k=2, p=1, s=1, d=1). After the skin image has passed through the first pooling layer, the skin image may pass through a third convolutional layer (k=3, p=2, s=1, d=2) and a fourth convolutional layer (k=3, p=2, s=1, d=2) sequentially, and may pass through a second pooling layer (k=2, p=2, s=1, d=2) and a fifth convolutional layer (k=3, p=4, s=1, d=4) sequentially. Data output through the fifth convolutional layer may pass through a sixth convolutional layer (k=3, p=4, s=1, d=4), a seventh convolutional layer (k=1, p=4, s=1, d=4), an eighth convolutional layer (k=3, p=1, s=1, d=1), and a ninth convolutional layer (k=3, p=1, s=1, d=1). Here, "d" may indicate dilation.

Although not shown, the second segmentation model (semantic segmentation model) may be an artificial neural network model based on U-net and/or ResNet50. The first segmentation model may extract a local feature, and the second segmentation model may extract a global feature. Hereinafter, an ensemble model combining the advantages of the first segmentation model and the second segmentation model will be described.

Figure 6:
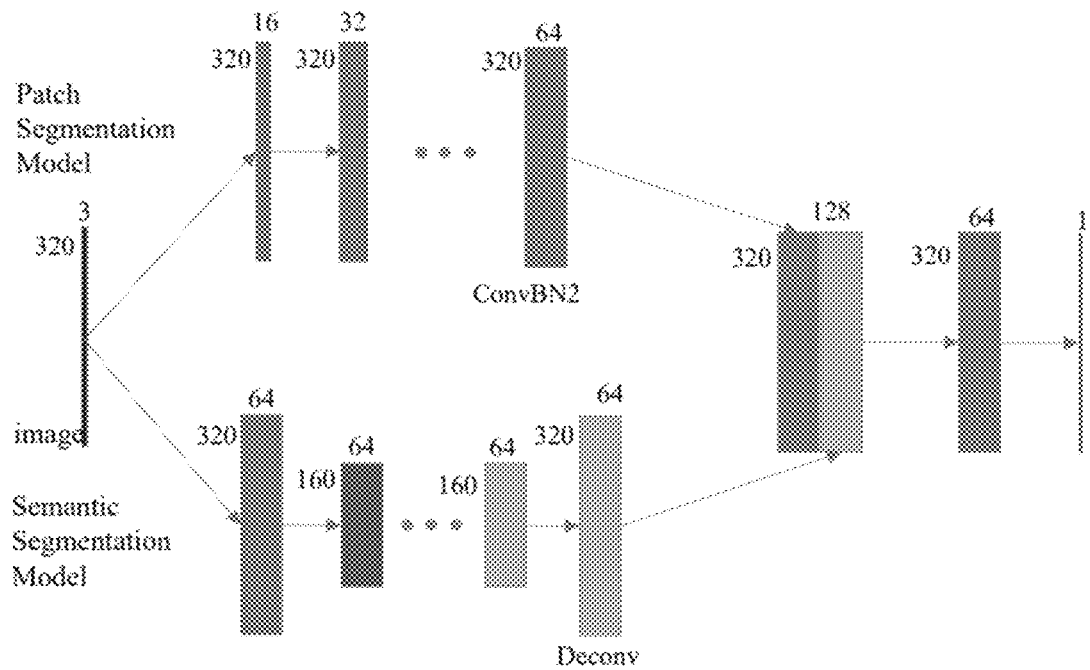
FIG. 6 shows an ensemble model that combines a first segmentation model (e.g., a patch segmentation model) and a second segmentation model (e.g., a semantic segmentation model) according to one embodiment.

FIG. 6 shows an ensemble model that combines a first segmentation model (e.g., a patch segmentation model) and a second segmentation model (e.g., a semantic segmentation model) according to one embodiment.

The wrinkle detector 102 may train the ensemble model using the first segmentation model and the second segmentation model. The wrinkle detector 102 may determine first output data output when a training input value corresponding to a skin image of each of a plurality of users is input into the first segmentation model and second output data output when the training input value is input into the second segmentation model. The wrinkle detector 102 may train an ensemble model that outputs a wrinkle probability map by inputting training data obtained by applying a first weight to the first output data and applying a second weight to the second output data into a fully-connected layer.

The wrinkle detector 102 may generate ensemble data by combining, in the depth direction, first output data that has passed through a convolutional layer (e.g., the ninth convolutional layer (k=3, p=1, s=1, d=1)), which is a layer immediately preceding the output layer of the first segmentation model, and second output data that has passed through a deconvolutional layer, which is a layer immediately preceding the output layer of the second segmentation model, and may input the generated ensemble data into a final convolutional layer. The wrinkle detector 102 may extract a wrinkle probability map by inputting the ensemble data into the final convolutional layer.

The first segmentation model, the second segmentation model, and the ensemble model may calculate a first loss function according to Equation 1 below using an output vector obtained as an output of hidden layers when the training input value is input and a training output vector corresponding to a wrinkle probability map according to the training output value, and may be subjected to supervised-learning such that the result value of the calculated first loss function is minimized.

$$L_{dice} = 1 - \frac{2 \times \sum_i^n (p_i \times g_i)}{\sum_i^n (p_i^2) + \sum_i^n (g_i^2)} \quad \text{[Equation 1]}$$

In Equation 1, $L_{dice}$ means the first loss function, n represents the number of samples, $p_i$ represents an i-th predicted value, and $g_i$ represents an actual ground truth value.

The patch classification model may calculate a second loss function according to Equation 2 below using an output vector obtained as an output of hidden layers when the training input value is input and a training output vector corresponding to a wrinkle probability map according to the training output value, and may be subjected to supervised-learning such that the result value of the calculated second loss function is minimized.

$$L_{bce} = -\sum_i^n g_i \times \log(p_i) + (1 - g_i) \times \log(1 - p_i) \quad \text{[Equation 2]}$$

In Equation 2, $L_{bce}$ means the second loss function, n represents the number of samples, $p_i$ represents an i-th predicted value, and $g_i$ represents an actual ground truth value.

Figure 7:
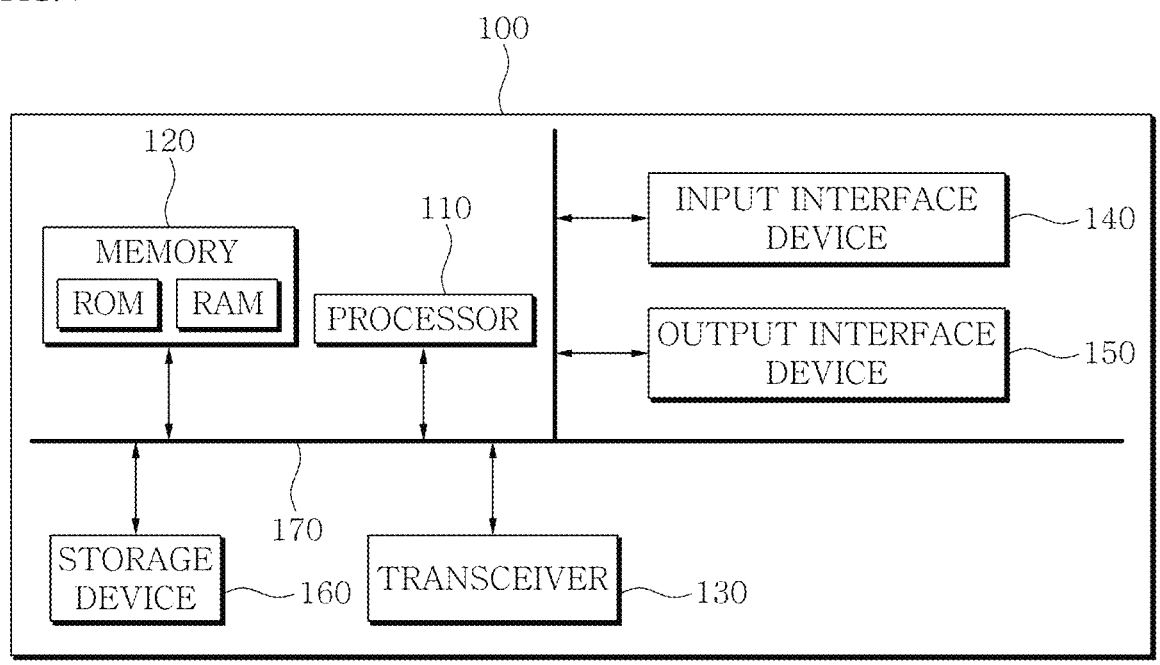
FIG. 7 is a diagram showing the hardware configuration of the wrinkle detection service providing server of FIG. 1.

FIG. 7 is a diagram showing the hardware configuration of the wrinkle detection service providing server 100 of FIG. 1.

Referring to FIG. 7, the wrinkle detection service providing server 100 may include at least one processor 110 and a memory storing instructions instructing the processor 110 to perform at least one operation.

The at least one operation may include at least some of the operations or functions of the wrinkle detection service providing server 100 described above, and may be implemented in the form of instructions and performed by the processor 110.

The processor 110 may mean a central processing unit (CPU), a graphics processing unit (GPU), or a dedicated processor on which methods according to embodiments of the present disclosure are performed. Each of a memory 120 and a storage device 160 may be configured as at least one of a volatile storage medium and a non-volatile storage medium. For example, the memory 120 may be one of a read only memory (ROM) and a random access memory (RAM), and the storage device 160 may include a flash-memory, a hard disk drive (HDD), a solid state drive (SSD), various memory cards (e.g., a micro SD card), or the like.

In addition, the wrinkle detection service providing server 100 may include a transceiver 130 that performs communication through a wireless network. In addition, the wrinkle detection service providing server 100 may further include an input interface device 140, an output interface device 150, the storage device 160, and the like. Components included in the wrinkle detection service providing server 100 may be connected to each other by a bus 170 to perform communication. In FIG. 7, the wrinkle detection service providing server 100 has been described as an example, but the present disclosure is not limited thereto. For example, a plurality of user terminals may include the components according to FIG. 7.

According to various embodiments of the present disclosure, result data can be obtained quickly by using the apparatus and method of the present disclosure, compared to a conventional artificial neural network model related to wrinkle detection.

In addition, various effects recognized directly or indirectly through the present specification can be provided.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software.

Examples of a computer-readable recording medium include hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

In addition, all or part of the configuration or function of the above-described method or apparatus may be implemented in combination or implemented separately.

Although the present disclosure has been described above with reference to the embodiments of the present disclosure, those skilled in the art may variously modify and change the present disclosure without departing from the spirit and scope of the present disclosure as set forth in the claims below.

DESCRIPTION OF SYMBOLS

100: WRINKLE DETECTION SERVICE PROVIDING SERVER
200: USER TERMINAL

What is claimed is:

1. A wrinkle detection service providing server for providing a wrinkle detection method based on an artificial intelligence, comprising:
   a data pre-processor for obtaining a skin image of a user from a skin measurement device and performing pre-processing based on feature points based on the skin image;
   a wrinkle detector for inputting the skin image pre-processed through the data pre-processing into an artificial neural network and generating a wrinkle probability map corresponding to the skin image;
   a data post-processor for post-processing the generated wrinkle probability map; and
   a wrinkle visualization service providing unit for superimposing the post-processed wrinkle probability map on the skin image and providing a wrinkle visualization image to a user terminal of the user,
   wherein the wrinkle detector comprises a wrinkle detection model that is trained using training data consisting of a training input value corresponding to a skin image of each of a plurality of users obtained from a plurality of user terminals and a training output value corresponding to the wrinkle probability map and generates the wrinkle probability map corresponding to the user based on a deep learning network consisting of a plurality of hidden layers,
   and the wrinkle detector inputs the pre-processed skin image of the user into the wrinkle detection model based on a convolutional neural network (CNN), and generates a wrinkle probability map corresponding to the skin image based on output of the wrinkle detection model.

2. The wrinkle detection service providing server according to claim 1, wherein the wrinkle detection model comprises a feature map extraction layer comprising at least one convolutional layer that receives a learning feature vector obtained by transforming learning data according to a skin image of a preset size, at least one activation layer, and at least one pooling layer;
   a fully-connected layer that transmits an output vector calculated using output values received from the feature map extraction layer to an output layer; and
   an output layer that determines a probability corresponding to the output vector by applying an activation function to the output vector, and outputs an output vector having the highest determined probability.

3. The wrinkle detection service providing server according to claim 2, wherein, based on a training input value corresponding to a skin image of each of a plurality of users, the wrinkle detector trains a first segmentation model for extracting a local feature and a second segmentation model for extracting a global feature.

4. The wrinkle detection service providing server according to claim 3, wherein the wrinkle detector determines a first output value output when a training input value corresponding to a skin image of each of a plurality of users is input to the first segmentation model and a second output value output when the training input value is input to the second segmentation model, and
   the wrinkle detector trains the wrinkle detection model, which is an ensemble model that outputs a wrinkle probability map by inputting training data obtained by applying a first weight to the first output value and applying a second weight to the second output value into a fully-connected layer.

* * * * *